May 23, 1967   H. D. LARSON   3,320,673
HYDRAULIC MEASURING DEVICE
Filed Oct. 14, 1965
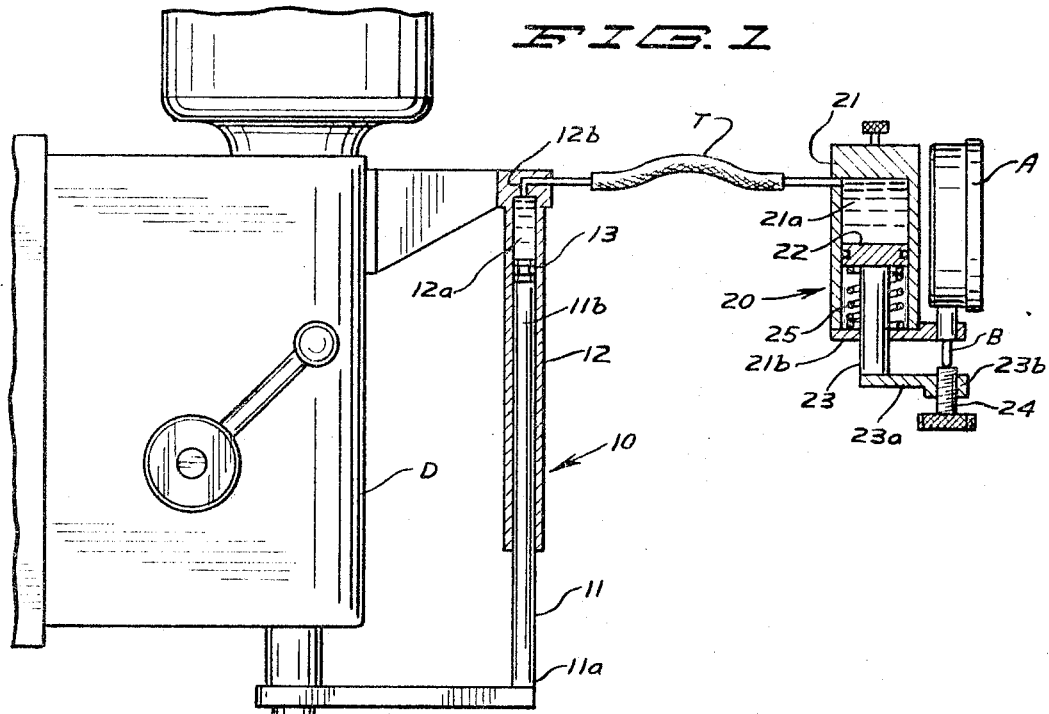
FIG. 1
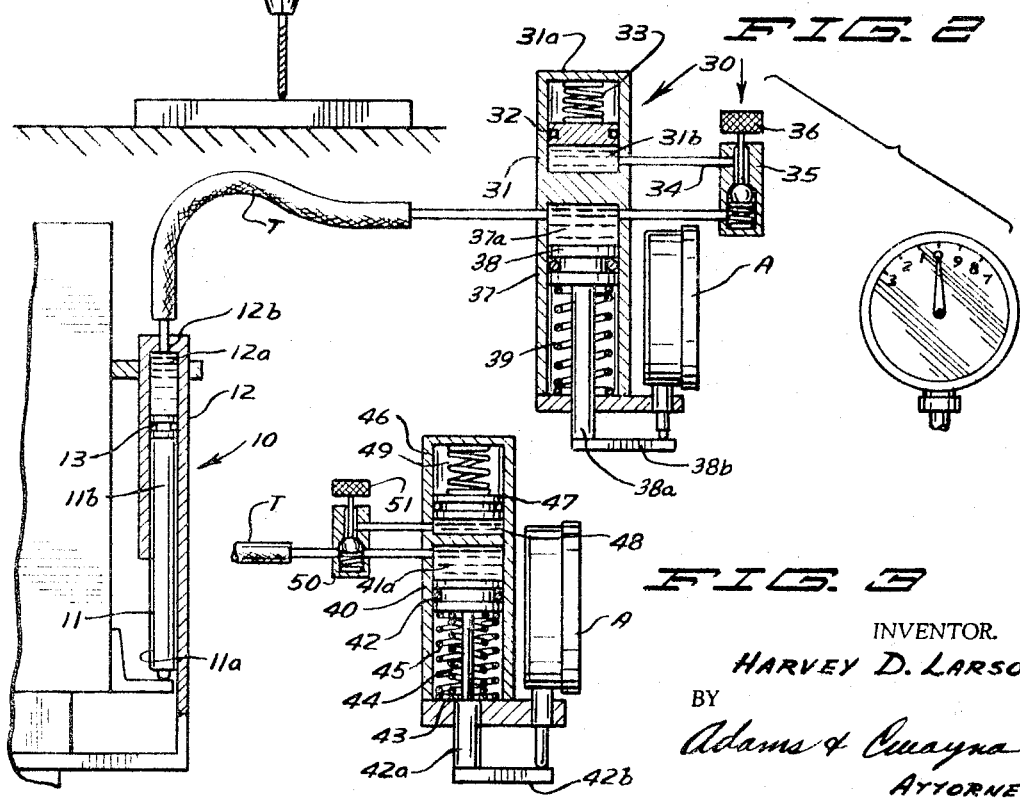
FIG. 2
FIG. 3
INVENTOR.
HARVEY D. LARSON
BY
Adams & Cuayna
ATTORNEYS

United States Patent Office 3,320,673
Patented May 23, 1967

3,320,673
HYDRAULIC MEASURING DEVICE
Harvey D. Larson, Minneapolis, Minn., assignor to Nedmac, Inc., Minneapolis, Minn., a corporation of Minnesota
Filed Oct. 14, 1965, Ser. No. 495,971
6 Claims. (Cl. 33—172)

This invention relates generally to hydraulically operated measuring equipment and more particularly to a meausring device which is adapted to precisely read relatively long travel movements of a tool or work piece through a standard dial indicator or the like which standard dial indicator normally is responsive to relatively short tool or work piece movements.

In many applications a work piece or tool is required to be moved a substantially large distance to a proper operating position and with equipment presently available it is difficult to properly calibrate this long distance unless a supplemental measuring unit is used. With the apparatus as provided in this invention, however, it is possible to measure these relatively long travels of a tool or work piece through the use of a standard dial indicator by providing a transfer mechanism such that the effective distance which the dial indicator is responsive to is within the dial's scope of sensitivity. In ths manner it is possible to provide through a method of relative ram or piston sizes a method for measuring such long travel strokes so as to bring the tool or work piece to a coursely measured location without requiring any additional independent measuring equipment.

The apparatus as provided herein is further unique in that it eliminates the requirements of external power sources as this measuring is designed to be attached either directly to the tool or the work piece whose movement is to be measured.

It is therefore an object of applicant's invention to provide a hydraulic measuring device which will automatically proportion the movement of a tool or work piece such that a relatively long movement or travel may be measured through the use of a standard dial indicator which dial indicator normally is arranged to sense only minimal movements of a unit.

It is a further object of applicant's invention to provide a hydraulic measuring device which requires no external power source but which directly senses the movement of the tool or work piece.

It is a further object of applicant's invention to provide a hydraulic measuring device incorporating a certain anti-backlash loading structure which will insure the preciseness of the unit.

It s a further object of applicant's invention to provide a unique automatic zeroing device for a hydraulic measuring tool such that a zero may be determined at any point in the travel of the work piece or tool being measured.

It is a further object of applicant's invention to provide a hydraulic measuring unit which permits direct attachment and measurement of a tool or work piece while permitting remote reading of the tool or work piece's travel.

These and other objects and advantages of my invention will more fully appear from the following description made in conecntion with the accompanying drawings, wherein like reference characters refer to the same or similar parts through the several views, and in which:

FIG. 1 is a partial vertical section illusrtating a hydraulic measuring device embodying the concepts of applicant's invention illustrating the operation thereof in connection with a drill press;

FIG. 2 is a view similar to FIG. 1 illustrating a first modified form of the invention; and FIG. 3 is a vertical section illustrating a second modified form of the invention.

In accordance with the accompanying drawings the hydraulic measuring device incorporating the concepts of this invention is illustrated in cooperation with a drill press D or the like, wherein the sensing section 10 of the device is attached for movement with the drill press chuck or other similarly easily accessible portion of the drill press.

Sensing section 10 in each of the three forms is of similar construction and therefore will be described initially. As illustrated in FIG. 1 and 2 the sensing element comprises a first sensing ram 11 having one end 11a thereof arranged for attachment to the work piece or tool member. A substantially cylindrical housing 12 is provided to operatively receive the other end 11b of the sensing ram 11 and in the form shown this end 11b is provided with a sealing member such as an O-ring 13 at its upper most end 11b to provide a sealed relation with the internal walls of the longitudinally extending cylinder 12.

It would of course be possible to provide this rod 11 and cylinder 12 relation through the incorporation of a seal at the lowermost end of the longitudinal cylinder 12 with the rod 11 received within the sealing member to slide within the cylinder 12 to force the hydraulic fluid therefrom or to draw the hydraulic fluid therein.

It should be noted that important aspects of this sensing element 10 are the substantially long cylinder 12 with a substantially long piston or sensing rod 11 arranged for actuation and travel therein. In this manner substantially long travels of the work piece or tool may be delivered to the sensing rod 11 and the cooperating cylinder 12.

Within the internal passage or cavity 12a of cylinder 12 hydraulic fluid is provided for movement in response to movement of rod 11. This hydraulic fluid is directed from the uppermost part of the cylinder 12 through an aperture 12b formed in the head of the cylinder. A conduit or the like T is provided to receive the fluid flow from or to cylinder 12 as the rod 11 is moved upwardly or downwardly therein in cooperation with the work piece or tool. Hydraulic fluid is directed through the flexible tube or the like generally designated T which tubing may be flexibly provided to permit the use of the sensing element 10 at the work piece or tool and provide the actuating or receiving element 20 at a remote location.

The receiving element 20 as illustrated in the first or preferred form of FIG. 1 illustrates a substantially cylindrical member 21 having a cavity 21a therein to receive the hydraulic fluid from the sensing element 10 and is likewise provided with a piston 22 in working relation within the cylinder 21 whereby the fluid received into the cylinder cavity 21a acts against the uppermost surface of the piston 22. Naturally for efficient operation this piston 22 must be sealingly mounted within the walls of the cylinder 21. A piston rod 23 is provided on piston 22 to transmit the movement of the piston 22 externally of the cylinder 21 and in the form shown this rod 23 extends outwardly through the bottom of cylinder 21 and is provided with a lever arm 23a extending horizontally outward therefrom with a boss end 23b to receive an adjustment nut or the like 24 therein. Directly, upwardly aligned with the adjustment nut 24, a dial indicator designated A is provided such that the actuating element B of the dial A is in alignment with the adjustment nut 24. Dial A is of standard well-known indicator construction and may be calibrated in any of the various units presently known depending upon the preciseness of the measurement to which the work piece will be set or the preciseness with which the location of the work piece is to be determined. Naturally the use of the thumb screw 24 in alignment with the dial is to achieve a means for setting an initial zero reading on the dial.

In this preferred form a pressure balance spring 25 is provided between actuating piston 22 and a portion of the cylinder housing 21b for actuation therebetween. The purpose of spring member 25 is to provide residual pressure to the piston 22 and to likewise balance the fluid pressure being exerted on the opposite side of piston 22. This spring 25 will insure positive upward movement of the piston 22 and thereby insure movement of the dial A, in accordance with the downward motion of the sensing rod 11 of the sensing cylinder 10.

It should be noted as illustrated in FIG. 1 that the relative sizes of the piston 22 and the sealed end 13 of the rod element 11 are substantially different. The purpose of this size variation is to permit large travels of the sensing rod 11 to be transmitted to the dial in a desired proportion. In other words the area of piston 22 may be, for example, ten times greater than the area of the piston 11 and in which case piston 22 would travel 1/10 the distance traveled by rod 11. Various other area relationships may be used but for this example a ten inch movement of rod 11 resulting in a one inch movement of piston 22 would permit a standard dial indicator A to be attached to the receiver piston 22. It should therefore be obvious that large relative tool movements may be read on a single dial indicator with little degree of difficulty.

A modified form of this invention is illustrated in FIG. 2 where, as illustrated, the receiving section of the unit is generally designated 30 and includes the first response cylinder and piston arrangement similar to the construction of FIG. 1. In FIG. 2 the cylinder cavity is designated 37a, the cylinder designated 37, the operative piston with its appropriate sealing mechanism designated 38, the piston rod designated 38a and the spring element designated 39. In addition to this already described first response structure an additional reservoir 31 is provided having a piston 32 sealingly provided therein with a spring member 33 interposed between the piston 32 and one end 31a of cylinder 31.

The pressure receiving side of the reservoir piston faces a cavity 31b and a transmission conduit designated 34 extends from cavity 31b to pressure cavity 37a and is provided with a spring loaded, releasable check valve structure 35 with a finger actuating release 36 thereon. Again a dial indicator A is provided for actuation by arm 38b of the sensing piston 38. It should be noted in this form that spring 33 is of substantially less strength or is of a substantially lower spring constant than the pressure balance spring 39 within the receiving cylinder 37.

In construction of this form which operates as an automatic zeroing setting attachment the pressure limit spring 39 is normally unstressed at a zero indicator reading. In operation of this form assuming a zero indicator reading with spring 39 unstressed and therefore being at its fullest length, as the piston 38 is moved upwardly as for example in response to the sensing rod 11 moving downwardly, piston 38 tends to move away from contact with spring 39 and a reading is obtined on dial A. To return the dial indicator to a zero reading and the piston 38 to the initial zero position, check valve 35 is depressed through actuator 36 and due to the action of spring 33 fluid will be forced from cavity 31b to cavity 37a thus forcing piston 38 downwardly against the pressure balance spring 39. As balance spring 39 is greater in strength than spring 33, fluid will not pass into the cavity 21a after the piston 38 comes in contact with spring 39.

The reverse of this situation is likewise true in that should piston 38 be driven downwardly through an upward shifting of sensing rod 11 causing fluid to flow into the cylinder 37a, spring 39 will be forced into a stressed position and again a reading will result on dial A. Now to achieve the zero setting it is only necessary to depress the check valve 35 which will permit, due to the difference in spring constants between spring 39 and spring 33, flow back into cavity 31b of hydraulic fluid from cavity 37a. Naturally when spring 39 reaches an unstressed condition, fluid flow will cease and the dial indicator will again be at the zero reading.

It should be noted that the various sizes of cylinders 37 and 31 in this particular form will require calculation in accordance with specific applications and to the specific flow volumes which will be utilized in the installation.

In a further alternate form which again incorporates a zero setting device, as illustrated in FIG. 3, certain additional spring combinations are provided. This structure as shown is a result of the combination of the above discussed structures and essentially includes the same elements as heretofore discussed. Again a receiving cylinder portion 40 is provided having an internal cavity 41a therein with a piston 42 sealingly mounted for reciprocation therein with an extending shaft or rod 42a having a lever arm 42b for attachment to a dial indicator A. One major difference in the shaft 42a is the provision of a shoulder and washer retaining element 43 located at a position on shaft 42a spaced from the bottom of piston 42. Interposed between this stop 43 and the piston 42 a first spring element 44 is provided. A second spring element 45 is provided to normally abut with the bottom of cylinder 40 and the under side of the piston 42. In this case the second of said springs 45 may be said to be a pressure balance spring element as before discussed while the first of said springs 44 may be termed a limit spring.

Again an automatic zero returning reservoir is provided including a reservoir cylinder 46 having a piston 47 mounted for sealing reciprocation therein providing a cavity 48 between the piston and one end of the cylinder 46. A third spring member 49 is again installed behind piston 47 and in this sense this spring may be termed a drive spring. A releasable check valve 50 is again provided to control flow of fluid between cylinder cavity 41a and cylinder cavity 48 and again is provided with an actuating element 51 for control thereof.

In operation of this alternate form the relative strengths of the three mentioned springs are important and it should be noted that the strength of the limit spring element 44 is greater than that of drive spring 49 and in turn the strengh of drive spring 49 is greater than the strength of the pressure balance spring 45. It should also be noted that the combined strengths of the balance spring 45 and the limit spring 44 is greater than the strength of the drive spring 49. It should also be noted that balance spring 45 is in a stressed condition when the dial indicator is at a zero setting. This arrangement insures positive movement of piston 42 upwardly.

In operation of this alternate form a downward movement of piston 11 will cause the piston 42 to move upwardly away from the spring combination 44–45 while carrying limit spring 44 therealong upwardly due to the anchoring of this spring 44 on the shaft 42a. To obtain automatic zeroing of this unit when the movement of piston 42 has been upwardly, it is only necessary to depress the check valve 51 and permit the hydraulic fluid in cavity 48 to be directed into the cavity 41a through the action of drive spring 49 on piston 47. As spring 49 is stronger than spring 45, this flow is possible. Naturally when piston 42 returns to a position where the shoulder 43 contacts the bottom of cylinder 40 the additional pressure of spring 44 will prevent further downward movement of piston 42 at which time the dial indicator will be at zero.

In reverse, should the piston 42 be driven downwardly by an upward movement of the sensing rod 11 the unit will be returned to a zero position by depressing the check valve 50 through the lever member 51 and the strength of the limit switch 44 in conjunction with balance spring 45 being substantially greater than that of the drive spring 49, will drive the piston 42 upwardly causing fluid to flow from the cavity 41a to cavity 48 against the spring 49. The strength of the drive spring 49 will not permit the balance spring 45 to become completely unstressed and flow will cease when spring 44 is at its full extent due to the relative strengths therefore retaining spring 45 in a stressed condition which is the desirable condition for proper actuation should the piston 42 be driven upwardly.

It should be obvious that applicant has provided a new and unique measuring device which permits remote reading of large travels of a tool or work piece while receiving only limited movements of the tool or work piece transmitted thereto such that the receiving element may be used to drive a standard tool dial indicator or the like.

It will, of course, be understood that various changes may be made in the form, details, arrangements and proportion of parts without departing from the scope of the invention, which generally stated consists in the matter set forth in the appended claims.

What I claim is:

1. A hydraulic linear measuring device including:
   (a) a first hydraulic assembly including a cylinder with a fluid contained therein and having a first positive fluid displacement element operable therein said element arranged for attachment to a movable apparatus whereby movement of the apparatus will produce a variation of the fluid within the cylinder;
   (b) a second hydraulic assembly including a cylinder with a fluid confined therein and having a second positive fluid displacement element therewithin;
   (c) a pair of spring members in said second assembly in actuating relation to said second fluid displacement element, one of said spring members arranged for movement with said second fluid displacement element;
   (d) means providing communication between said first and second assembly to transfer fluid from said first to said second assembly; and
   (e) a gauge member connected with said second assembly for actuation thereby whereby the increments of movement are indicated thereon.

2. The structure set forth in claim 1 wherein said spring member arranged for movement with said fluid displacement element has a substantially greater spring constant then the other of said spring members and said second spring element is normally arranged in a compressed position at a zero reading of said dial indicator.

3. The structure set forth in claim 2 and a third hydraulic reservoir assembly including a cylinder with a fluid confined therein and having a positive fluid displacement element therein with means affording controllable communication between said second and third assemblies whereby fluid may be transferred between said second and third assemblies to return the dial indicator to an initial zero setting.

4. The structure set forth in claim 3 and a spring member arranged for driving the positive fluid displacement element of said third assembly with the spring constant thereof being intermediate the spring constants of the spring members in said second assembly but being less than the combined spring constant of said second assembly spring members.

5. A hydraulic linear measuring device including:
   (a) a pair of interconnected hydraulic assemblies each assembly including:
      (1) a cylinder with fluid confined therein; and having
      (3) a positive fluid displacement element therewithin with provision for permitting relative movement between said displacement element and its respective cylinder;
   (b) a first of said assemblies being adapted for attachment to apparatus having a movable member whereby the movement of the member will produce a variation in the fluid displacement within its respective first cylinder;
   (c) The diameter of said second assembly being substantially larger than said first apparatus-connected assembly in order to permit relatively large increments of linear movement of said first assembly to produce only relatively short increments of movement in the second cylinder assemblies;
   (d) A spring element disposed in said second assembly acting against the positive fluid displacement element therewithin;
   (e) A hydraulic reservoir assembly connected to said second, larger hydaulic assembly having a quantity of fluid confined therein and including:
      (1) a positive fluid displacement element for displacing fluid from said reservoir to said second larger hydraulic assembly;
      (2) spring means of relatively less strength than the spring means of said second larger assembly; and
      (3) means for controlling the flow of fluid between said second larger and said reservoir assembly; and
   (f) a gauge member connected with said second larger assembly for actuation thereby whereby the increments of movement are indicated thereon.

6. The structure set forth in claim 5 wherein said flow control means including a check valve normally preventing flow between said reservoir and said second, larger assembly but selectably controllable to permit communication therebetween upon actuation of said valve.

References Cited by the Examiner

UNITED STATES PATENTS 2,371,893  3/1945  Hyland _____ 60—54.5

FOREIGN PATENTS 992,478  5/1965  Great Britain.

LEONARD FORMAN, *Primary Examiner.*

J. M. FREED, *Assistant Examiner.*